United States Patent [19]

Raines

[11] 4,281,624

[45] Aug. 4, 1981

[54] ANIMAL FEEDER FOR FLOWABLE MATERIALS

[76] Inventor: Raymond Raines, 1320 S. Denver, Russellville, Ark. 72801

[21] Appl. No.: 97,239

[22] Filed: Nov. 26, 1979

[51] Int. Cl.$^3$ ................................................ A01K 5/00
[52] U.S. Cl. .................................... 119/52 R; 119/77
[58] Field of Search ...................... 119/52 R, 51.5, 53, 119/72, 77

[56] References Cited

U.S. PATENT DOCUMENTS

| | | | |
|---|---|---|---|
| 983,978 | 2/1911 | Chapman | 119/77 |
| 2,562,165 | 7/1951 | Baringer | 119/77 |
| 2,746,423 | 5/1956 | Runion | 119/52 R |
| 2,787,248 | 4/1957 | Brendle | 119/52 R |
| 2,941,506 | 6/1969 | Fulton | 119/52 R |
| 4,034,715 | 7/1977 | Arner | 119/52 R |

*Primary Examiner*—Jay N. Eskovitz
*Attorney, Agent, or Firm*—Robert Brown, Jr.

[57] ABSTRACT

A pet feeding device composed of a horizontally upright serving container having an opening in its upper end and an inverted feed-supply container having an opening in its lower end, wherein the open ends are axially inserted in overlapped position and then attached to one another in response to relative movement between the containers transversely of the axes of insertion.

A pair of tongue-and-groove assemblies or joints are employed to guide the containers during the relative transverse movement, the tongue component of each joint being integral with the overlapped end of one of the containers and the groove component integral with the proximate overlapped end of the other container. By moving the supply container transversely and rearwardly from its axially inserted position, the tongue components of the joints intermesh progressively mesh with the groove components until the supply container reaches its normal position of use at the rear portion of the serving container. Conversely, by moving the supply container in the opposite direction toward its axially inserted position, the components are unmeshed progressively to disengage it from the supply container.

4 Claims, 13 Drawing Figures

U.S. Patent  Aug. 4, 1981  Sheet 1 of 3  4,281,624
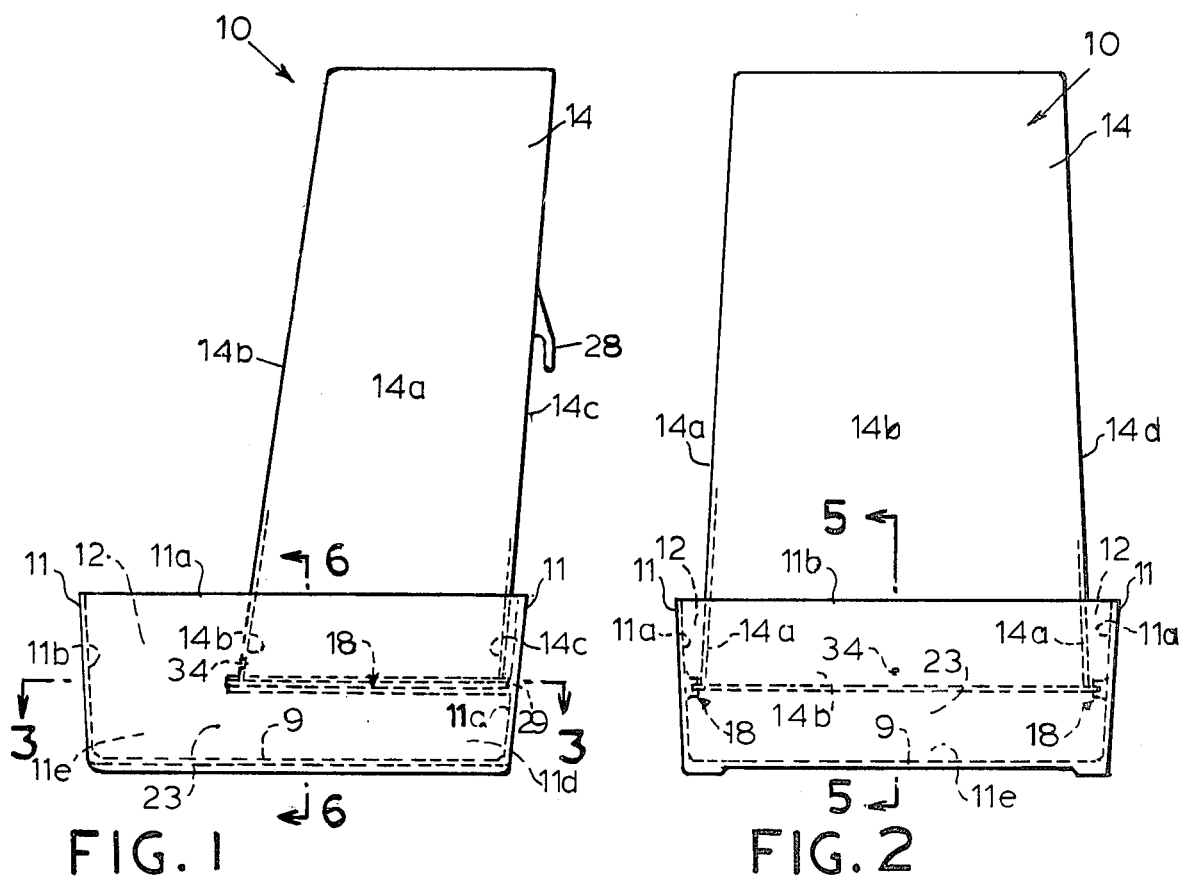
FIG. 1
FIG. 2
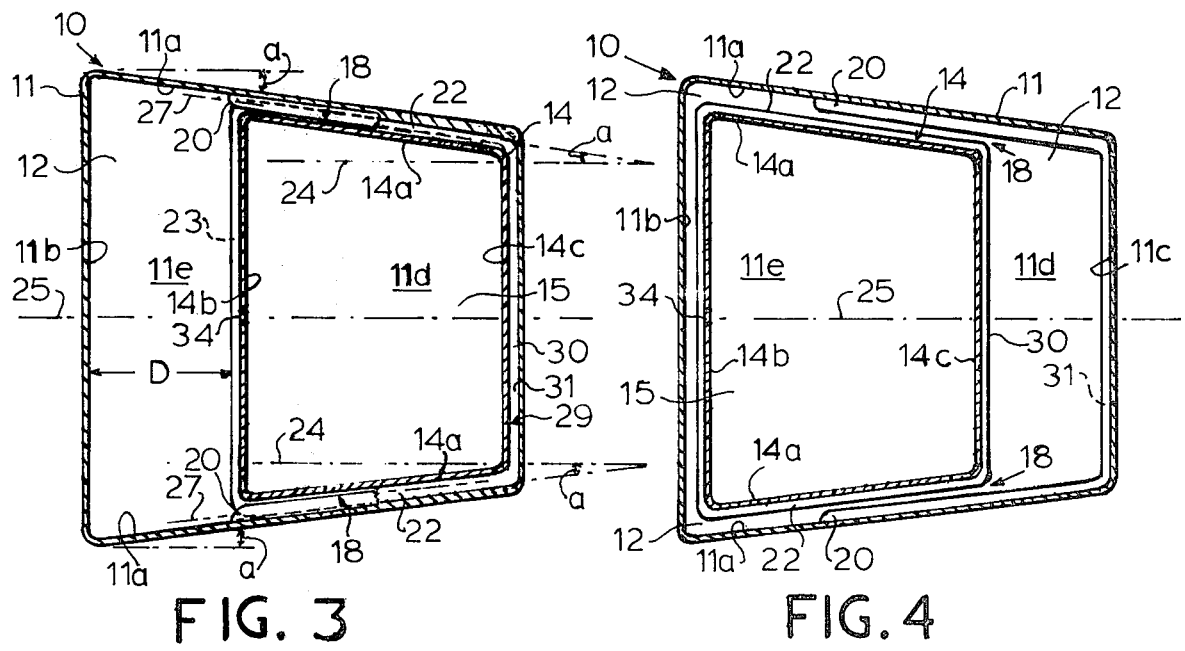
FIG. 3
FIG. 4

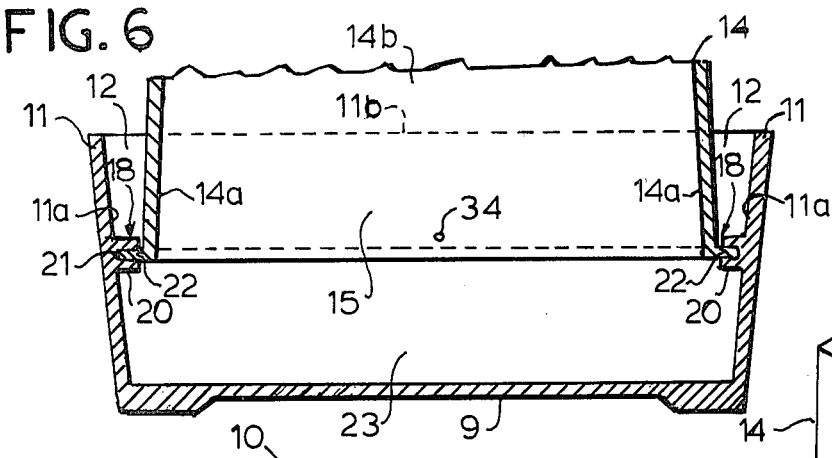
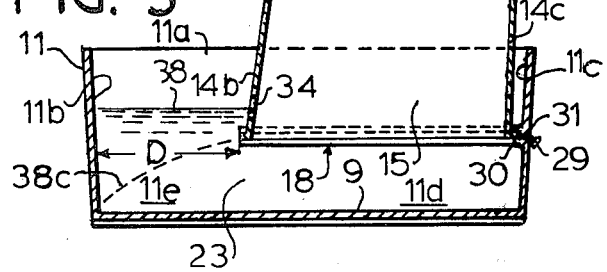
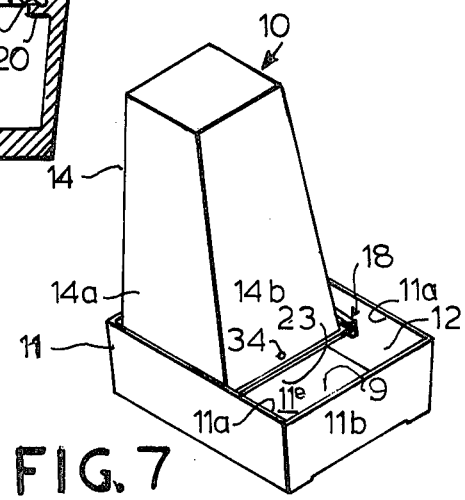
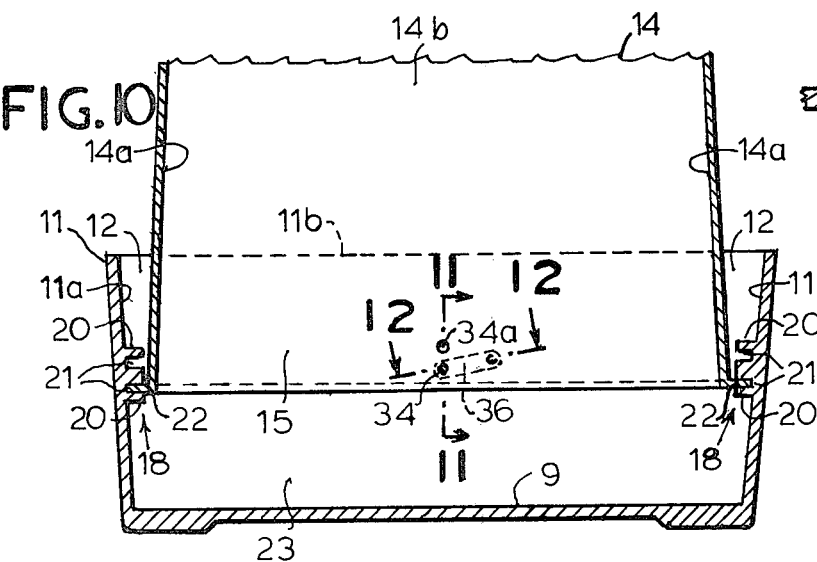
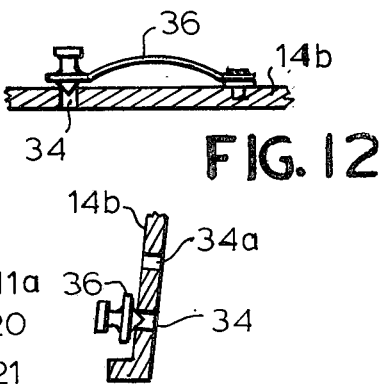
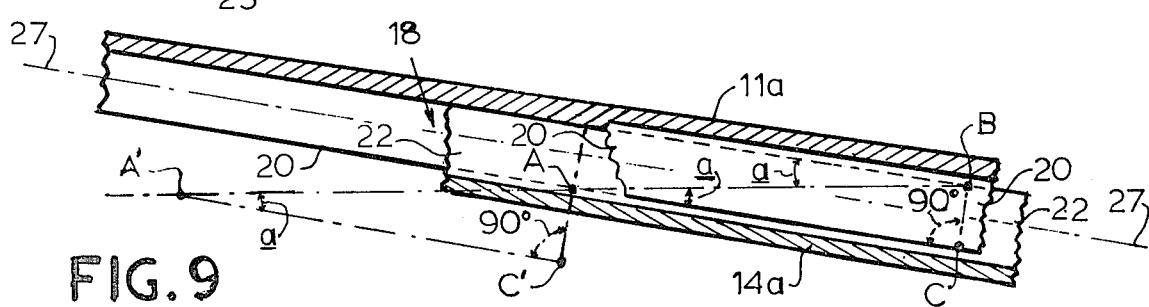

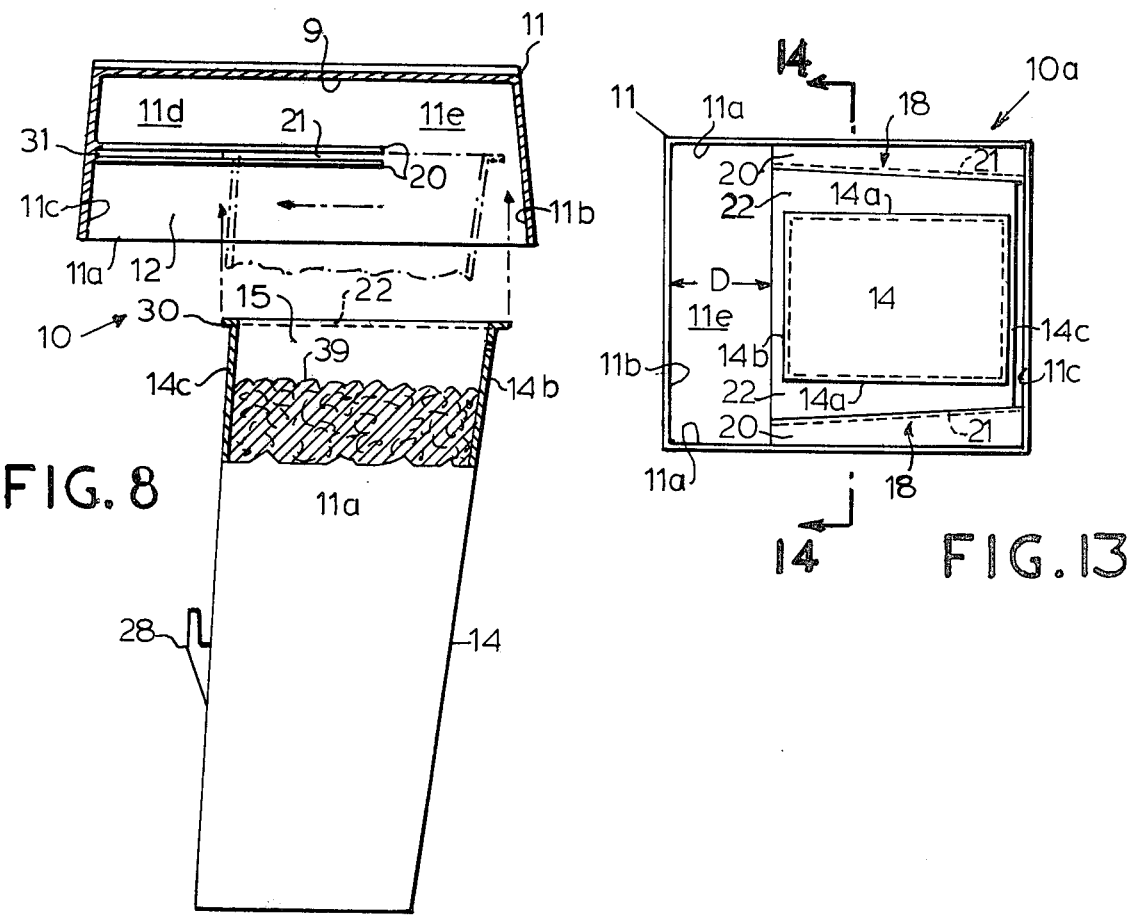

ANIMAL FEEDER FOR FLOWABLE MATERIALS

This invention relates to feeding devices of flowable materials for pets and more particularly to a portable device of the class described comprising an open-ended feed supply container and an open-ended serving container for receiving feed from the former, wherein the open ends of the containers attachable and detachable to and from their normal operating positions by means of a pair of convergent tongue-and-groove joints.

Heretofore, numerous types of pet feeders have been provided such as disclosed in the patent to French Pat. No. 395,490 and in the patents to Pearce, Manning and Arner U.S. Pat. Nos. 3,720,184, 3,730,141 and 4,034,715 respectively; but so far as applicant is aware, he is the first to provide a feeder constructed and arranged as recited in the above abstract of disclosure It is therefore an object of this invention to provide a pet feeder wherein the open ends of a feed supply container and a feed receiving container are releasably attached together in normal overlapped coinciding position by means of a pair of convergent tongue-and-groove joints.

It is another object of invention to provide the feeder described in the immediately preceding paragraph wherein the coinciding container ends are released from attached position in response to relative movement of the containers toward one another and transversely of their vertical axes, and conversely, detachable in response to movement of the containers away from one another.

It is a further object of this invention to provide a pet feeder of the class described which employs means for adjusting the rate of flow of dry feeds available for consumption by the pets; and when used for feeding liquids, to provide means for adjusting the elevation of the liquid level.

It is yet another object of invention to provide a pet feeder made from relatively resilient low-cost, lightweight materials such as plastic, and which is sturdy, practical, relatively inexpensive to the consumer and simple and easy to dismantle for cleansing and feed replacement.

Some of the objects of invention having been stated, other objects will appear as the description proceeds when taken in connection with the accompanying drawings, in which:

FIG. 1 is a side elevation of my improved pet feeder consisting of a supply container and a serving container in their normal assembled position;

FIG. 2 is a front elevation looking at the left-hand side of FIG. 1;

FIG. 3 is a sectional plan view taken along line 3—3 in FIG. 1;

FIG. 4 is a plan view similar to FIG. 3, but showing the containers in laterally detached positions, but with their respective open ends in overlapped position prior to vertical separation;

FIG. 5 is a vertical longitudinal sectional view taken along line 5—5 in FIG. 2;

FIG. 6 is an enlarged sectional view taken along line 6—6 in FIG. 1;

FIG. 7 is an isometric view of the feeder as used;

FIG. 8 is an exploded sectional view with each of the containers inverted from their normal position and showing the manner of engagement and disengagement one with the other;

FIG. 9 is a detail view illustrating mathematically the relationship of the containers while being detached from normal wedged engagement;

FIG. 10 is a sectional view similar to FIG. 6, showing a modified form of invention;

FIG. 11 is a sectional detail view taken along line 11—11 in FIG. 10;

FIG. 12 is a sectional detail view taken along line 12—12 in FIG. 10, and

FIG. 13 is a plan view of another modified form of the invention.

Referring more specifically to FIGS. 1-8 of the drawings, the numeral 10 broadly denotes my improved pet feeder comprising the combination of (1) a substantially horizontal serving container 11 having a bottom 9, a pair of oppositely disposed sidewalls 11a, 11a cooperating with oppositely disposed front and rear walls 11b, 11c to define an opening 12 in its upper end, and (2) an inverted supply container 14 having a pair of oppositely disposed sidewalls 14a, 14a cooperating with oppositely disposed front and rear end walls 14b, 14c to define an opening in its lower end.

The upper marginal end portions of sidewalls 11a, 11a and of rear end walls 11b, 11b of container 11 respectively overlap the lower marginal end portions of sidewalls 14a, 14a and of front and rear end walls 14, 14b thereby causing the opening 15 of the supply container to normally axially coincide with the rear end space 11d in the serving container. The non-coinciding front end space 11e in the container 11 normally extends forwardly beyond the front end of the supply container 14 and serves as an outlet from which the pets eat and drink.

Containers 11 and 14 have each of their oppositely disposed overlapping sidewall marginal ends connected by a tongue-and-groove joint 18, said joints 18, 18 slidably supporting the containers for relative movement forwardly and rearwardly of the feeder 10 and being positioned substantially in a common horizontal plane.

Although the tongue-and-groove joints 18, 18 are described as converging rearwardly and laterally inwardly of feeder 10 when looking rearwardly, it is evident the assemblies will diverge laterally outwardly when looking forwardly.

Each joint 18 includes a tongue component 22 integral with and extending laterally outwardly from the lower end of one of the sidewalls 14a and a groove component 20 extending laterally inwardly from the upper proximate end of sidewall 11a, said component 20 having a groove 21 therein for slidably receiving tongue 22. It will be readily understood that tongue component 22 could be mounted upon container sidewall 11a and groove component 20 upon supply container wall 14a without departing from the spirit of the invention.

As best shown in FIGS. 1, 2 and 5-7, a passageway 23 connects the rear end space 11d with the front end space 11e in serving container 11 so that feed materials can flow downwardly from supply container 14 into space 11d and then horizontally forwardly through passageway 23 into front end space or feed outlet 11e.

FIG. 9 is an enlarged fragmentary sectional plan view showing one of the tongue-and-groove joints 18 connecting the proximate overlapping ends of the serving and supply container sidewalls 11a and 14a, respectively, and converging rearwardly and laterally inwardly relative to the longitudinal centerline 25 of the feeder 10, also shown in FIGS. 3 and 4. In these views, the tongue 22 and groove 21 are completely meshed corresponding to the normal relative position occupied by the containers when in use, that is, the position shown in FIG. 3 and with the containers releasably attached together.

The points A, B and C in FIG. 11 define an imaginary right triangle superimposed upon the overlapping width of the tongue and the groove at any location along its length. Line BC represents the overlap distance between the tongue and groove measured at right angles to the centerline 27 of assembly 18; line AC, the triangle base which coincides with the inside boundary of the overlapping area; line AB, the hypotenuse extending parallel to the longitudinal centerline 25 of the feeder, and a, the acute angle of taper or convergency between the base line AC and hypotenuse AB.

In order to eliminate overlap or intermesh BC to thereby laterally release the containers from one another, the supply container 14 must move forwardly from its normal position and parallel to hypotenuse AB until points B, C and A coincide with points A, C' and A' respectively (FIG. 9). In the latter position, the tongue 22 on supply container wall 14a is released from engagement with groove 21 in the serving container wall 11a, approximately as shown in FIG. 4.

The mathematical formula for computing the forward travel distance BA may be deduced as follows:

$$BC/BA = \sin a$$

Therefore, $$BA = BC/\sin a \qquad (I)$$

In the present device, the disengaging release distance varies inversely with the size of the convergency angle a. For example, let us assume the overlap BC is 0.125 inch and the angle a is 3 degrees, the natural sine of 3 degrees being 0.052.

Then, by substituting in formula (I), $$\text{Release distance } BA = 0.125/0.052 \text{ or } 2.40 \text{ inches} \qquad (Ia)$$

Again, if the angle of convergency a is increased from 3 to 5 degrees in example (Ia) above, the sine of 5 degrees being 0.087, then $$\text{Release distance } BA = 0.125/0.087 \text{ or } 1.44 \text{ inches} \qquad (Ib)$$

Thus, when the angle of convergency is increased from 3 to 5 degrees, the release distance BA is increased inversely from 2.40 inches to 1.44 inches.

On the other hand if the overlap distance BC is increased from 0.125 inches to 0.250 inches in example (Ia) above, with the same angle of convergency of 3 degrees.

Then, release distance $BA = 0.250/0.052$ or 4.80 inches (Ic)

Thus, an increase of the overlap distance BC from 0.125 to 0.250 doubles the the release distance BA.

In FIGS. 1-8, the opposite sidewalls of each of the assembled containers 11 and 14 converge rearwardly and inwardly at the same acute angle a. Although this convergent sidewall appearance is often desirable, it is not necessarily critical to the performance of the feeder. For example, in FIGS. 13 and 14 the serving container 11 and the supply container 14 are each rectangular while the tongue-and-groove assemblies 18, 18 connecting the container ends converge rearwardly and inwardly as described in connection with the preceding forms of invention.

Another advantage of providing rearwardly and inwardly convergent tongue-and-groove joints 18, 18 resides in the provision of means for releasably fastening or latching the supply and serving containers together. After the containers are moved together in their initial normal operating position, a slight additional movement in the same direction will produce lateral pressure between the tongue and the groove component of each of the joints 18 to thereby releasably wedge the containers together.

The clearance distance D between the inside surface of front wall 11b of serving container 11 and the inner opposed lower ends of supply container 14 (FIG. 3) must be at least equal to, and preferably somewhat more than, the travel distance BA (FIG. 11) required to eliminate the overlap BC between the tongue 22 and groove 21 of each assembly 18 and, at the same time, provide adequate lateral clearance between the ends of the inwardly projecting guideways 20, 20 at front end area 11b to permit the lower end of the supply container to be lifted vertically from its overlapping position with the serving container opening.

A hook 28, integral with the back wall 14c of container 14, is provided to releasably support the feeder 10 in an elevated position, if desired (FIG. 1).

In order to additionally strengthen the overlapping connection between the open ends of containers 11 and 14, another tongue-and-groove assembly 29 may be provided between the overlapped rear end walls 11c and 14c, said assembly 29 comprising a tongue 30 extending laterally and rearwardly from wall 14a and a groove 31 in wall 11c for receiving the tongue.

When feeder 10 is used to dispense liquids, a small opening 34 is provided in the lower end portion of the front wall 14b and below the top perimeter of the serving container walls to thereby limit the liquid level in the feeding outlet or front space 11e of the serving container 11. As will be noted in FIG. 5, the liquid level 38 in outlet 11e is normally slightly above opening 34 while the liquid level 38a in container 14 is higher due to the atmospheric pressure upon level 28. When the liquid level 38 drops, the opening 34 will be exposed to permit liquid in the container to flow through the opening into space 11e. When dry material is being fed by the feeder, the opening 34 is not used. Instead, the material flows forwardly from the rear space 11d through opening 23 and into outlet 11e where the level of the feed is maintained approximately in the position indicated by the dotted line 38c.

The liquid level in outlet 11e may be also varied, as shown in FIG. 10, by providing two pairs of vertically spaced and oppositely disposed groove components 20, 20 on the inner opposed walls 11a, 11a, respectively, into which the opposite rearwardly extending tongues 21, 21 of the supply container 14 are selectively inserted. This latter arrangement not only varies the liquid level, but also further varies the flow of dry feed through passageway 23 into outlet space 11e.

The assembly of the containers is effected in the reverse order of their assembly described above in connection with FIGS. 1-7. For example, with containers 11 and 14 disassembled in upside-down positions shown in FIG. 8 and with the supply container filled with dry feed 39, the supply container is axially telescoped to its overlapping dot-dash line position and then moved transversely of the axes of insertion to cause the tongues on the supply container 14 to engage the grooves of the serving container.

I claim:

1. In a pet feeder of flowable materials, a horizontally disposed serving container (11) provided with a bottom (9), front and rear walls (11b, 11c) and a pair of substantially vertical oppositely disposed sidewalls (11a, 11a), the upper margins of said walls defining an opening (12) in the upper end of the container, and an inverted supply container (14) provided with front and rear walls (14b, 14c) and a pair of substantially vertical oppositely disposed sidewalls (14a, 14a) relatively shorter than the sidewalls of said first opening, the lower margins of the inverted container defining an opening (15) in its lower end, said oppositely disposed sidewall margins of the inverted container being vertically overlapped respectively by and in laterally spaced relation to said oppositely disposed segments of the serving container sidewall margins to thereby provide a passageway between the container ends, in combination with a pair of tongue-and-groove joints (18, 18) respectively connecting said oppositely disposed sidewall margins of the inverted container (14) to said overlapping sidewall segments of the serving container (11), said joints slidably supporting the inverted container upon the serving container and for movement along a path extending forwardly and rearwardly of the feeder, the tongue component (22) of each of said joints (18, 18) being integral with and projecting laterally from one of said connected overlapping sidewall margins and the associated groove component (20) being integral with the other of said connected overlapping sidewall margins and laterally intermeshing with said tongue component (22), each of said joints (18, 18) converging rearwardly and laterally inwardly at an acute angle a relative to said path to cause its tongue and groove components to unmesh longitudinally and laterally, progressively in response to forward movement of the supply container, and conversely, to cause the components to intermesh longitudinally and laterally, progressively in response to rearward movement of the supply container.

2. The feeder defined in claim 1 wherein the respective proximate sidewall margins of the serving and supply containers converge rearwardly and laterally inwardly toward said path at substantially the same acute angle as that of said joints.

3. The pet feeder defined in claim 2 wherein said means for unmeshing the tongue component from the groove component of each of the joints satisfies the conditions of the following formula:

$$BA = BC/\sin a$$

in which BC is the lateral overlap distance of the tongue with the groove of each said joints when the containers are assembled in normal position; BA is the longitudinal distance between the normal intermeshed position and the unmeshed or released position of each tongue and groove component; and (a) is the angle of convergency of each joint relative to the path of movement of the containers, whereby the longitudinal release distance (BA) between normal intermeshed and unmeshed positions of said tongue and said groove components increases as the size of the angle of convergency (a) decreases, and conversely.

4. The pet feeder defined in claim 1 wherein said means for unmeshing the tongue component from the groove component of each of the joints satisfies the conditions of the following formula:

$$BA = BC/\sin a$$

in which BC is the lateral overlap distance of the tongue with the groove of each of said joints when the containers are assembled in normal position; BA is the longitudinal distance between the normal intermeshed position and the unmeshed or released position of each tongue and groove component; and (a) is the angle of convergency of each joint relative to the path of movement of the containers, whereby the longitudinal release distance (BA) between normal intermeshed and unmeshed positions of said tongue and said groove components increases as the size of the angle of convergency (a) decreases, and conversely.

* * * * *